(12) United States Patent
Gifford

(10) Patent No.: US 6,882,307 B1
(45) Date of Patent: Apr. 19, 2005

(54) INTERACTIVE SYSTEM FOR MONITORING AND INVENTORY OF EMERGENCY VEHICLES AND EQUIPMENT AND ASSOCIATED METHODS

(75) Inventor: Mark Gifford, Houston, TX (US)

(73) Assignee: Concentrax, Inc., Houston, TX (US)

( * ) Notice: Subject to any disclaimer, the term of this patent is extended or adjusted under 35 U.S.C. 154(b) by 0 days.

(21) Appl. No.: 10/842,241

(22) Filed: May 10, 2004

Related U.S. Application Data (60) Provisional application No. 60/469,511, filed on May 9, 2003.

(51) Int. Cl.[7] ............................ G01S 5/02; H04B 7/185; G08B 1/08

(52) U.S. Cl. ............................ 342/357.1; 342/357.06; 342/357.07; 701/213; 340/539.13

(58) Field of Search ...................... 342/357.06, 357.07, 342/357.1, 189, 173, 450; 340/539.1, 539.2, 539.13; 701/207, 213

(56) References Cited

U.S. PATENT DOCUMENTS

| | | | |
|---|---|---|---|
| 6,377,210 B1 | | 4/2002 | Moore |
| 2002/0011932 A1 | * | 1/2002 | Rodgers et al. ........... 340/572.1 |
| 2003/0052776 A1 | * | 3/2003 | Richards ..................... 340/539 |
| 2004/0024502 A1 | * | 2/2004 | Squires et al. ................ 701/33 |
| 2004/0150520 A1 | * | 8/2004 | Barrie ................... 340/539.13 |

* cited by examiner

*Primary Examiner*—Dao Phan
(74) *Attorney, Agent, or Firm*—Bracewell & Patterson LLP

(57) ABSTRACT

A system on interactive tracking and inventorying of incident response equipment and associated methods is provided. The system and methods enable command centers to determine the geographic location of all available emergency response equipment that are capable of responding to an incident. The systems and methods allow the inventory to be updated as equipment and personnel are spent during the course of the incident. The location of the equipment and personnel can be viewed on a topography map, as well as an aerial map, to enable the incident command to determine the atmospheric surroundings of each piece of equipment. The maps can be superimposed so that more than one type of map data can be viewed simultaneously.

36 Claims, 6 Drawing Sheets

INTERACTIVE SYSTEM FOR MONITORING AND INVENTORY OF EMERGENCY VEHICLES AND EQUIPMENT AND ASSOCIATED METHODS

RELATED APPLICATIONS

This application claims the benefit under 35 U.S.C. § 119(e) of U.S. Provisional Application Ser. No. 60/469,511, filed May 9, 2003, titled "Interactive System for Monitoring and Inventory of Emergency Vehicles and Equipment and Associated Methods," which is incorporated by reference in its entirety.

BACKGROUND OF THE INVENTION

1. Technical Field of the Invention

The present invention relates generally to a tracking and inventorying system for emergency vehicles and equipment during an incident. More particularly, the invention is further related to an interactive tracking system for inventorying available resources for use in an incident.

2. Description of Prior Art

Incidents or emergencies can happen anytime, any place, and any day. Agencies, such as the police, the fire department, the military, and the like must respond to these incidents in order to control, mitigate, or stop the incident. During these incidents, every second of time and every available resource counts, especially when lives are in danger.

Systems have been developed to try to assist in managing the incidents in a more efficient and speedier manner by allowing agencies to track the location of vehicles and equipment. An example system can be found in U.S. Pat. No. 6,377,210 issued to Moore. Moore describes an apparatus and method that uses a global positioning system (GPS) for determining a location of like vehicles and stores this information in a customer specific database. The location of a specific customer's vehicles can be displayed on a map. Systems such as the Moore system, however, do not contain a way to determine what type of equipment is available on these vehicles. Nor are these systems capable of keeping the available inventory of vehicles and equipment current. While knowledge of the location of a vehicle is useful, additional current information is needed to maximize the ability to bring incidents under control.

A need exists for a system that not only allows agencies to monitor the location of its vehicles or fleet, but also determines what type of equipment is available upon each vehicle. It would be useful for this information to be determined in an interactive fashion. It would be advantageous to provide an economical tracking system that is interactive. It would also be advantageous to provide a tracking and inventorying system that is easy to use and can be a useful tool in emergency situations. It would be advantageous to provide a user friendly format for receiving the tracking and inventorying information, such as on a map where the vehicles are clearly shown along with the equipment information for each vehicle.

BRIEF SUMMARY OF THE INVENTION

The present invention incorporates one or more of these advantages by providing a method and system of interactively monitoring and inventorying emergency vehicles and equipment. The method and system of the present invention has wide applicability in that it can be used in all types of incidents or emergencies. Exemplary applications include incidents or emergencies such as fires, natural disasters, times of war, terrorist attacks, and hazardous material spills. Other incidents in which the present invention would be helpful are known to those skilled in the art and are to be considered within the scope of the present invention.

The present invention advantageously provides a method of interactive tracking and inventorying of incident response equipment. The method preferably includes the step of determining information about an incident, such as an incident location, an incident identification, and an incident profile.

Once the information is determined about the incident, the location of available incident response equipment can be determined based on global positioning signals sent from a GPS system to the incident response equipment that is equipped with an equipment transceiver. The equipment transceiver receives the global positioning signals from the GPS and then transmits an equipment location signal to a command center through the use of a network. The equipment transceiver can convert the global positioning signals into a longitude and latitude prior to sending the signals to the command center. Other types of signals indicating the location of the equipment can be used, will be known to those of skill in the art, and are to be considered within the scope of the present invention.

The communication network can use various forms of communications and can include at least a portion of such communication means in the form of wireless communication means, such as a cellular communication network. Cellular communication networks are a good choice because of the widespread coverage that is available through an existing infrastructure that has a great deal of redundancy already embedded in the system. At least another portion of the communication network can also be in the form of the Internet. Other suitable types of communication networks can be used, such as a voice-over-IP systems, analog systems, Code Division Multiple Access (CDMA) networks, Global System for Mobile communications (GSM), Short Message Service (SMS) networks, and the like. Other suitable communication networks will be known to those of ordinary skill in the art and are to be considered within the scope of the present invention. The global positioning signals are sent from the equipment transceiver to the command center so that the command center can ascertain an equipment location of the incident response equipment.

The command center is coupled with a data center in data communication by a data network. The command center can be located near the scene of the incident or at a designated incident command center. The data network can be the Internet. Other types of data networks will be known to those of ordinary skill in the art and are to be included in the scope of the present invention. The data center preferably includes a computer server solely dedicated to this system. The data center can be located at the same location as the command center, but can also be located remotely from the command center. For example, if a municipality is using the system described herein, it could want to have the database at its facility to ensure the integrity of the data, i.e., to prevent hackers from being able to access the data. Equipment information is obtained from an equipment database that can be stored on the data center and transmitted from the data center to the command center. Equipment information is cataloged in the equipment database by a unique ID for each piece and type of equipment.

Examples of equipment information for a particular type of incident would include mobile equipment, auxiliary equipment, control equipment, and the like. Equipment can be grouped into types, such as mobile equipment for vehicles and manpower or personnel. Auxiliary equipment can include particular equipment stored or available on the mobile equipment, such as the number of fire hoses on a fire vehicle or a police dog in a particular police vehicle. Control equipment would include items such as staging area and command center. This equipment information can be correlated to a specific vehicle. The location of a vehicle and/or other type of equipment, jointly referred to as equipment location, is correlated with the equipment information and the incident location is correlated with the incident profile to determine an incident geographic region so that the region includes pertinent equipment location information currently located within the incident geographic region. The incident geographic region is a geographic region large enough to contain the equipment location and the incident location both within the same geographic region. Map data, which is stored in a map database located within the data center, is accessed for at least the incident geographic region and transmitted through the data network to the command center. At least a portion of the incident data, at least a portion of the equipment location, and at least a portion of the map data corresponding to the incident geographic region can be displayed. This information is preferably displayed on a map. The map can be a topography map, an aerial map, a street map, or combinations thereof.

The method embodiments of the present invention can also include updating the equipment information related to each piece of equipment to enable interactive inventorying of the available equipment. The information can be updated manually from within the vicinity of the incident equipment. For example, someone located in or near the equipment can communicate with the command center and inform the command center regarding the status of its equipment. Such information can be updated, as needed or desired. In an alternate embodiment, the equipment information can be updated through automatic or electronic methods. The command center will receive the information and then can determine whether or not to update the equipment database based upon the information received.

The present invention also advantageously provides a system for interactive tracking and inventorying of incident response equipment such as fire trucks, police vehicles, water towers, tanks and the like. The system preferably includes an incident locator, a GPS system, an equipment transceiver, a communication network, a data center, a map database, a command center, and a data network.

The incident locator preferably is used for determining or identifying the existence of an incident location, an incident identification, and an incident profile. The incident locator can be a vehicle responding to an incident, a report from a separate data center, or input from some other source relating to the existence of the incident. The equipment transceiver is coupled to a vehicle carrying equipment or a piece of equipment and receives global positioning signals from a GPS and transmits the equipment location of the equipment to the command center via a communications network. The equipment location can be transmitted through an equipment location signal, which is based upon the global positioning signals received from the GPS. Preferably, at least one transceiver is mounted in each of the equipment that is to be inventoried. The communication network preferably includes a wireless communication portion for receiving an equipment location signal from the transceiver and the incident location and for transmitting the equipment location and the incident location to a data center. Alternately, the incident location is communicated over phone lines, Internet or other means. The data center preferably stores the equipment location and the incident location in an incident database and correlates the equipment location with equipment information and the incident location with the incident profile to produce incident data. The incident database further includes incident contact information. The map data for at least one geographic region can also be stored in a map database. The command center preferably includes a data entry device, a processor, a memory device, and a display. The display can be used for displaying at least a portion of the incident data and at least a portion of the map data corresponding to the incident location and the equipment location. The data entry device can be used to enter the incident location, the incident identification, and the incident profile into the tracking and inventorying system. Alternately, the data entry device receives the information electronically and transmits the data in the proper form to store the appropriate information. The data network couples the data center and the command center in data communication. This coupling can be either permanent or removable in nature. The command center can be used to access the data network to obtain the incident data and the map data from the map database, which are then transmitted through the data network from the data center to the command center.

The present invention also advantageously provides a data processing system that is used to perform the methods described herein. The data processing system preferably includes a computer readable media and an interactive tracking and inventory manager. The interactive tracking and inventory manager preferably includes an incident locator to determine an incident location and an equipment locator to determine an equipment location. A correlator is then used for correlating the equipment location and an equipment identification with equipment information and the incident location with an incident profile to produce incident data. The correlator can be a manual means or an automated means. The incident data preferably includes an incident geographic region containing the equipment location and the incident location. A map data accessor is used for accessing map data for at least the incident geographic region. A map data transmitter for transmitting map data from a map database to a command center through a data network is used. A display is provided to display a portion of the incident data, at least a portion of the equipment information; and at least a portion of the map data corresponding to the incident geographic region.

In each embodiment of the present invention that uses the equipment transceiver, the equipment transceiver can be any type of device that is capable of receiving a signal, such as the global positioning system signals, and also sending or transmitting a signal, such as sending a signal to the command center. For example, a transceiver or a transponder is suitable for use as the equipment transceiver. Other suitable devices will be known to those of ordinary skill in the art and are to be considered within the scope of the present invention.

BRIEF DESCRIPTION OF THE DRAWINGS

So that the manner in which the above-recited features, advantages and objectives of the invention, as well as others that will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE INVENTION

The current invention addresses the shortcomings of the current systems for tracking available incident response equipment. The invention advantageously provides a method and system that allows users to track and inventory available resources for use in an emergency. The system is interactive and is displayed in a user-friendly format so the data is always current and easy to use. Typical information that is determined as a result of this step can be seen in FIGS. 3–5.

The present invention advantageously provides a method of interactive tracking and inventorying of incident response equipment. As described in FIG. 2, the method preferably includes the step of determining incident information (block 50), such as an incident location, an incident identification, an incident commander identity, an elapsed time since the incident began, an incident status, an incident directory, and an incident profile. This can be performed by receiving the information at the data center 26 electronically from the response vehicle, electronic receipt from external sources, telephone reporting, or other means.

Figure 2:
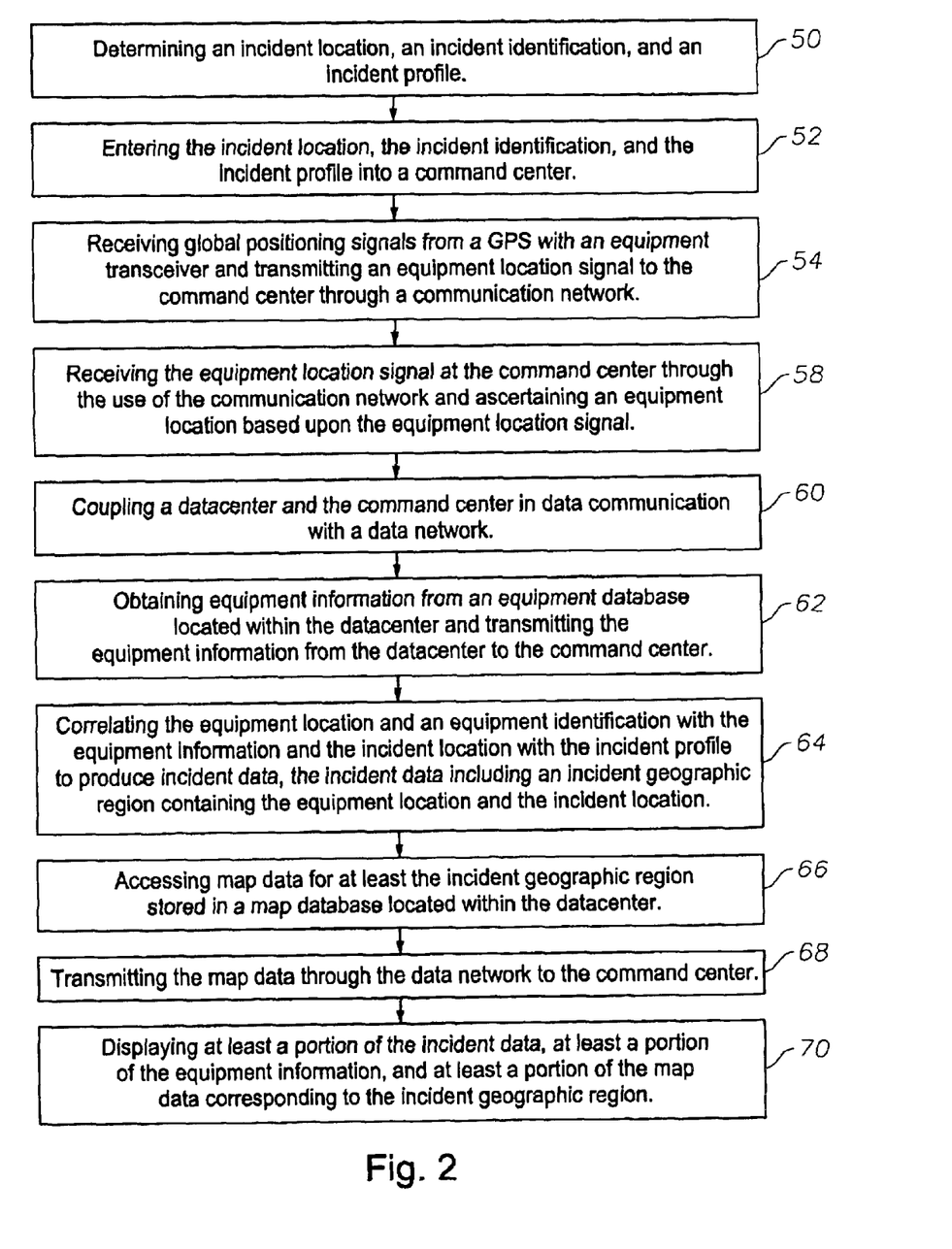
FIG. 2 is a simplified flowchart of the method of interactive tracking and inventorying of incident response equipment in accordance with one embodiment of the present invention.

The incident information can then be entered into a command center 30 (block 52). One such way in which the information can be input into the command center 30 of the system is through a city's normal emergency notification system. Typically a manual call is made to inform the city that an incident is occurring. If the city deems the incident significant enough to warrant an emergency response, a dispatcher will input the information from the caller into the emergency notification system. It is envisioned that the present invention would serve as an integral part of the city's emergency notification system. Inputting the incident information into the emergency notification system would simultaneously enter the information into the system of the present invention. If the system of the invention is not integrated with the emergency notification system, a user could input the information directly into the system through the command center 30 or could electronically populate the database.

Figure 3:
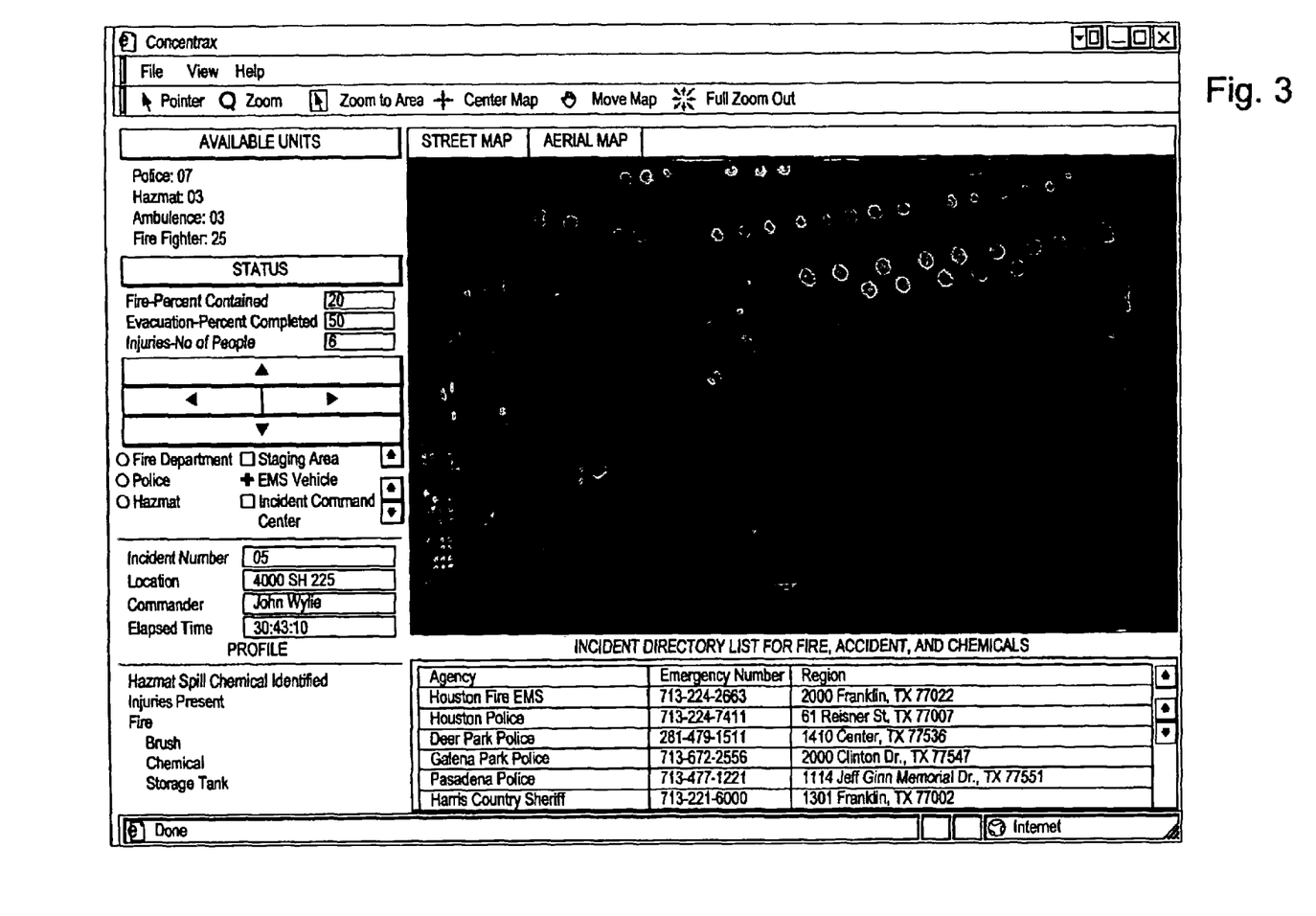
FIG. 3 is an image generated by the command center illustrating information about an incident with an aerial view corresponding to a geographic region containing the incident in accordance with one embodiment of the present invention.

The incident location is a physical location of an actual incident. The incident identification is a unique identification number or tag provided to help all incident responders determine specifically which incident is involved. As seen in FIG. 3, the incident status can include such information as the percentage of containment achieved relative to the emergency, the percent of evacuation completion in the area, the number of injuries to people, and combinations thereof. Other pertinent data regarding the incident can be added, such as the amount of a chemical spilled. The incident profile can include such information as the following: whether a hazmat chemical spill has been identified, if injuries are present, if fire conditions exist and level of conditions, wind conditions, weather conditions, and combinations thereof. The incident directory preferably includes such information as the agency to which the equipment belongs, emergency phone numbers, and the region in which the equipment is located. This incident information can be used in all embodiments of the present invention.

While specific examples of information that can be displayed or obtained using the present invention are given, these are merely illustrative and not intended to limit the scope of the present invention. Other data that would be pertinent and desired to be known will be known to those skilled in the art and are to be considered within the scope of all embodiments of the present invention.

Once the information is determined about the incident, the location of available incident response equipment, such as vehicles, can be determined by sending global positioning signals from a GPS to the incident response equipment equipped with an equipment transceiver 42. The equipment transceiver 42 receives the global positioning signals from the GPS and transmits an equipment location signal to the command center 30 through the use of a communication network 25 that includes a wireless communication portion (block 54).

Cellular communication networks are a good choice as the communication network 25 because of the widespread coverage that is available through an existing infrastructure that has a great deal of redundancy already embedded in the system. At least another portion of the communication network can also be in the form of the Internet. Other suitable types of communication networks 25 can be used, such as a voice-over-IP system, analog systems, Code Division Multiple Access (CDMA) networks, Global System for Mobile (GSM) communications, Short Message Service (SMS) networks, and the like. Other suitable communication networks will be known to those of ordinary skill in the art and are to be considered within the scope of the present invention.

A fixed GPS system 50 can be used to provide the use of differential GPS, as understood by those of skill in the art, which increases the accuracy of the determination of the equipment location. The fixed GPS system 50 can at least one weather station having a fixed, known latitude and longitude reading. A fixed weather station is particularly advantageous for use as the fixed GPS system 50 because it enables the command center 30 to obtain real time, up-to-date weather conditions, such as wind speed, wind direction, barometric pressure, and humidity, which are particularly useful when dealing with fires, chemical spills, or the like. The fixed GPS system 50 also enables users to apply a correction factor to the global positioning signals, to ensure the accuracy of the location of the equipment 40. The weather station has a known, fixed location. If there is random noise or interference with the global positioning signals, the signals can be corrected based upon the difference between the global positioning signals and the known location of the weather station. The correction can then be applied to the equipment 40 to obtain a more accurate reading of the equipment location. More than one weather station can be used to increase the accuracy of the equipment location ascertained from the global positioning signals. The weather stations can also be used to synchronize the map data stored within map database 32. For example, if both aerial map data and street map data are used, the weather station can be used to synchronize the data within both of the map data to ensure that the corresponding structures match up.

The command center 30 receives the equipment location from the equipment transceiver 42 through the use of the communication network 25 (block 58). The command center 30 can ascertain the location of the equipment based upon the equipment location signal received from the equipment transceiver 42. The system can track the equipment location continuously, on a predetermined interval, or on activation of a preselected criteria.

Figure 1:
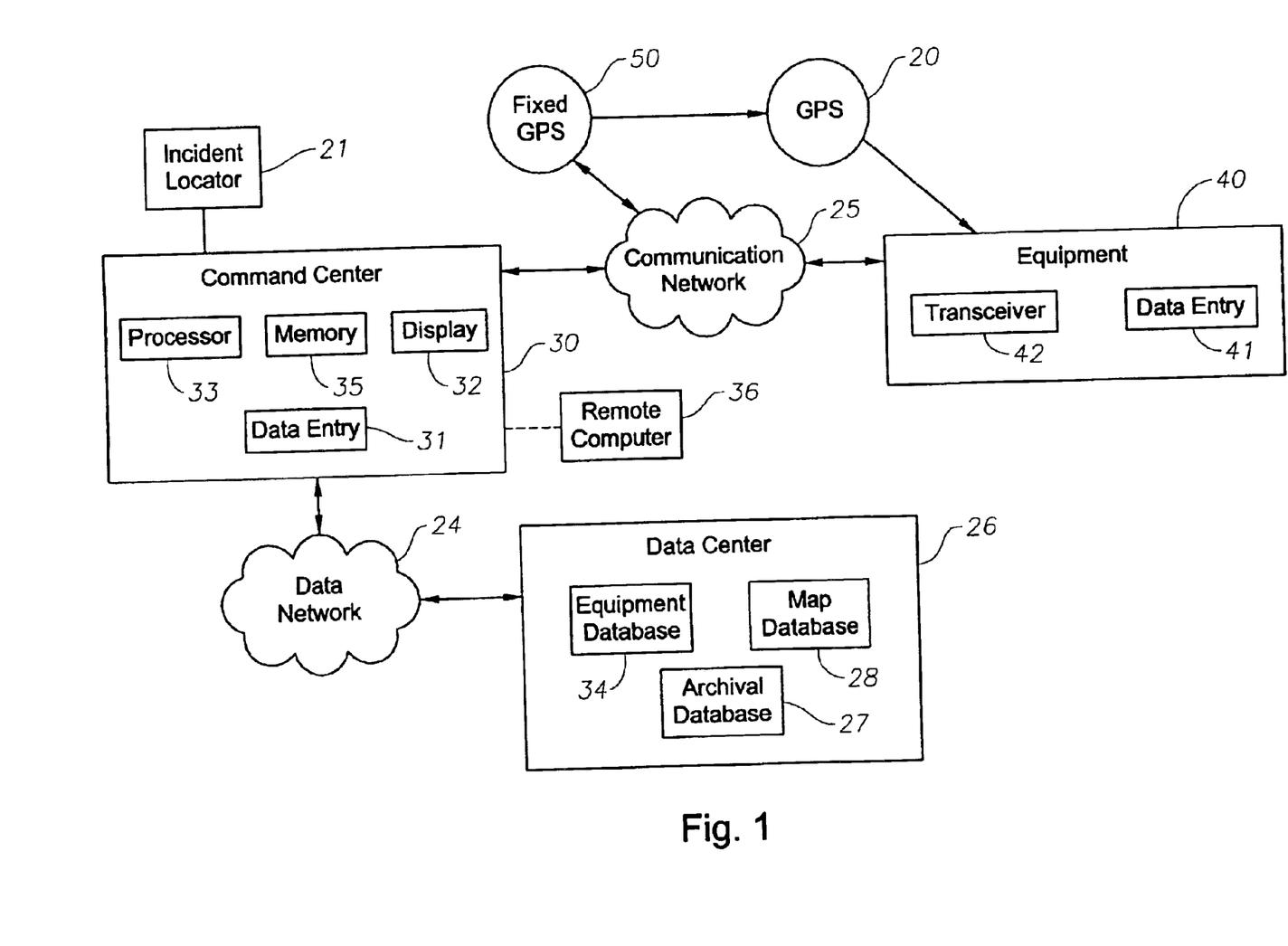
FIG. 1 is a perspective view of a interactive tracking and inventorying system in accordance with one embodiment of the present invention.

The command center 30 can be accessed through the use of a remote computer 36. This enables the system 15 to be used in remote areas or where physical access to the command center 30 is not possible. If the location of the command center 30 is not safe, remote access ensures the safety of the incident responders.

The command center 30 is coupled with a data center 26 in data communication by a data network 24 (block 60). The data network 24 is preferably the Internet. As shown in FIG. 1, the data center 26 preferably includes an equipment database 34 and a map database 28. The data center 26 can also include an archival database 27 that can include all reports for later review or critique of the emergency response efforts. The archival database 27 can be used to store all of the information that is sent to and received from the equipment 40 so that a complete history of an event can be replayed at a later date for debriefing or evaluation purposes.

The command center 30 and the data center 26 can be housed in the same facility. In an incident, however, the command center 30 could be located in a temporary location set up near an incident, particularly when the incident occurs in an isolated location.

Equipment information is obtained from the equipment database 34 and transmitted from the data center 26 to the command center 30 (block 62). The equipment information in all embodiments of the present invention can include an associated agency of the equipment 40, an equipment type, and any available resources located on the piece of equipment 40. The equipment information is preferably provided by each agency owning the equipment 40. The agency can send information to the command center 30 regarding its equipment. It is preferred that the agencies not have direct access to the equipment database 34, but rather the command center 30 update the equipment database 34 when updates to the equipment database 34 are provided by the agencies. This gives the command center 30 an opportunity to review the information and determine if it is appropriate for inclusion within the equipment database 34. It also decreases the chance of contamination of the equipment database 34. If deemed appropriate, the command center 30 can update the equipment database 34. If deemed inappropriate, the command center 30 can discard the information. The ultimate responsibility rests with each agency to ensure that its information is accurate in the equipment database 34.

Various agencies can provide updates to the equipment database 34 through the data network 24. The updates can be provided as frequently as needed to show a complete inventory of each agency's equipment that has the equipment transceiver 42 installed therein. Industries that produce and store hazardous materials can provide and update information regarding what materials are stored in specific locations, if appropriate. The updates can occur by the hour, day, or a often as necessary through the data network 24. The updates provided by these agencies allow the incident commander to have instant up-to-date information readily available.

The equipment database 34 is preferably maintained on a server located within the data center. For example, if a municipality is using the system described herein, it would likely want to have the database at its facility to ensure the integrity of the data, i.e., to prevent hackers from being able to access the data. In this situation, the data center and command center would likely physically be located within the same facility, depending upon the preference of the user. In the equipment database 34, all information associated with a piece of equipment is cataloged under a unique ID. The equipment that is supposed to be located on that vehicle or piece of equipment is listed in the equipment database 34 and is associated with that unique ID. It is preferred for the server to be solely dedicated to the equipment database 34.

The equipment location is correlated with the equipment information and the incident location is correlated with the incident profile to produce incident data (block 64). The incident data preferably includes an incident geographic region that contains the equipment location and the incident location. Map data, which is stored in the map database 28 located within the data center 26, is accessed for at least one geographic region containing the incident geographic region and transmitted through the data network 24 to the command center 30 (blocks 66 and 68). At least a portion of the incident data, at least a portion of the equipment location, and at least a portion of the map data corresponding to an incident geographic region are displayed (block 70).

Figure 4:
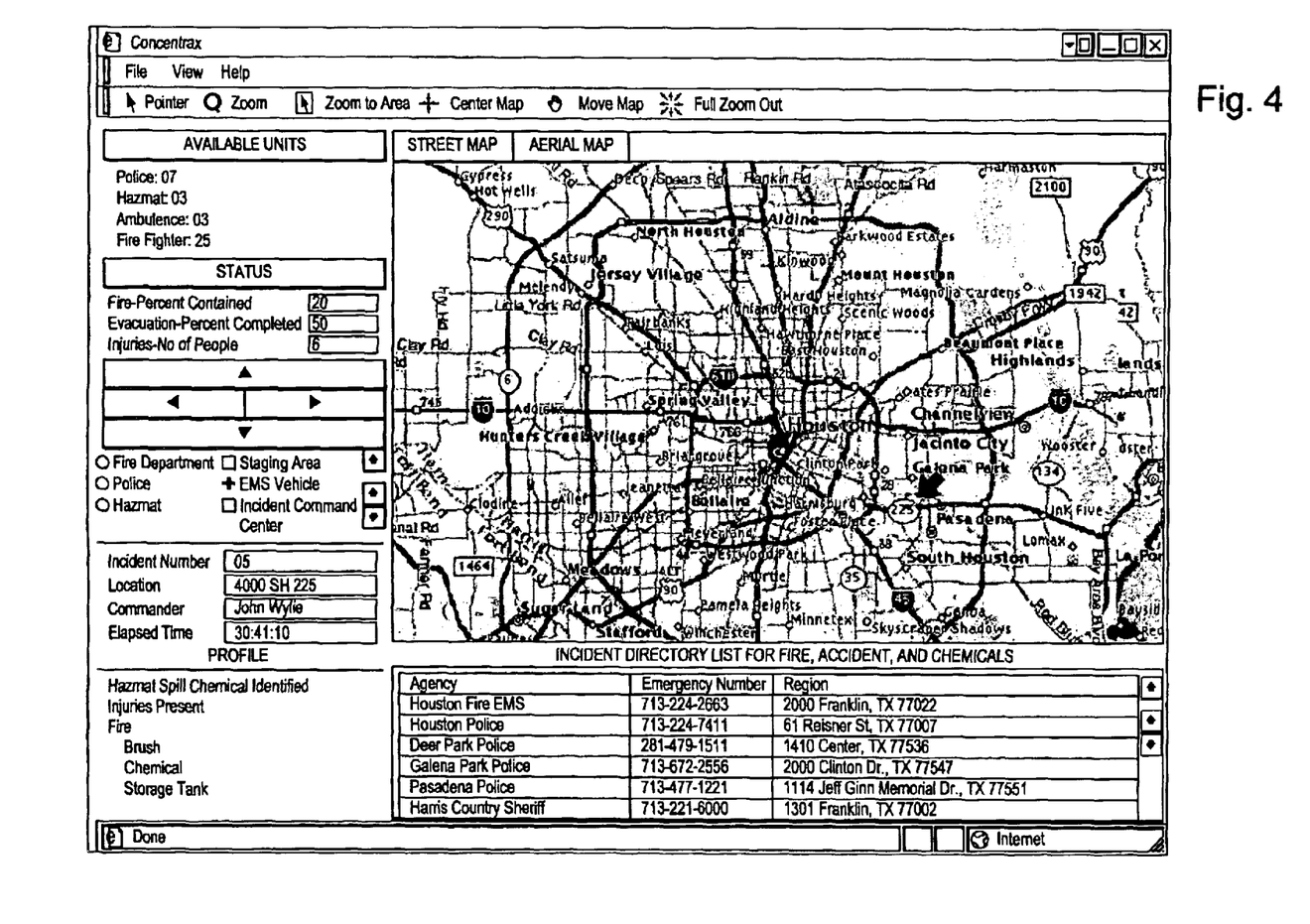
FIG. 4 is an image generated by the command center illustrating information about an incident with a street map corresponding to a geographic region containing the incident in accordance with one embodiment of the present invention.
Figure 5:
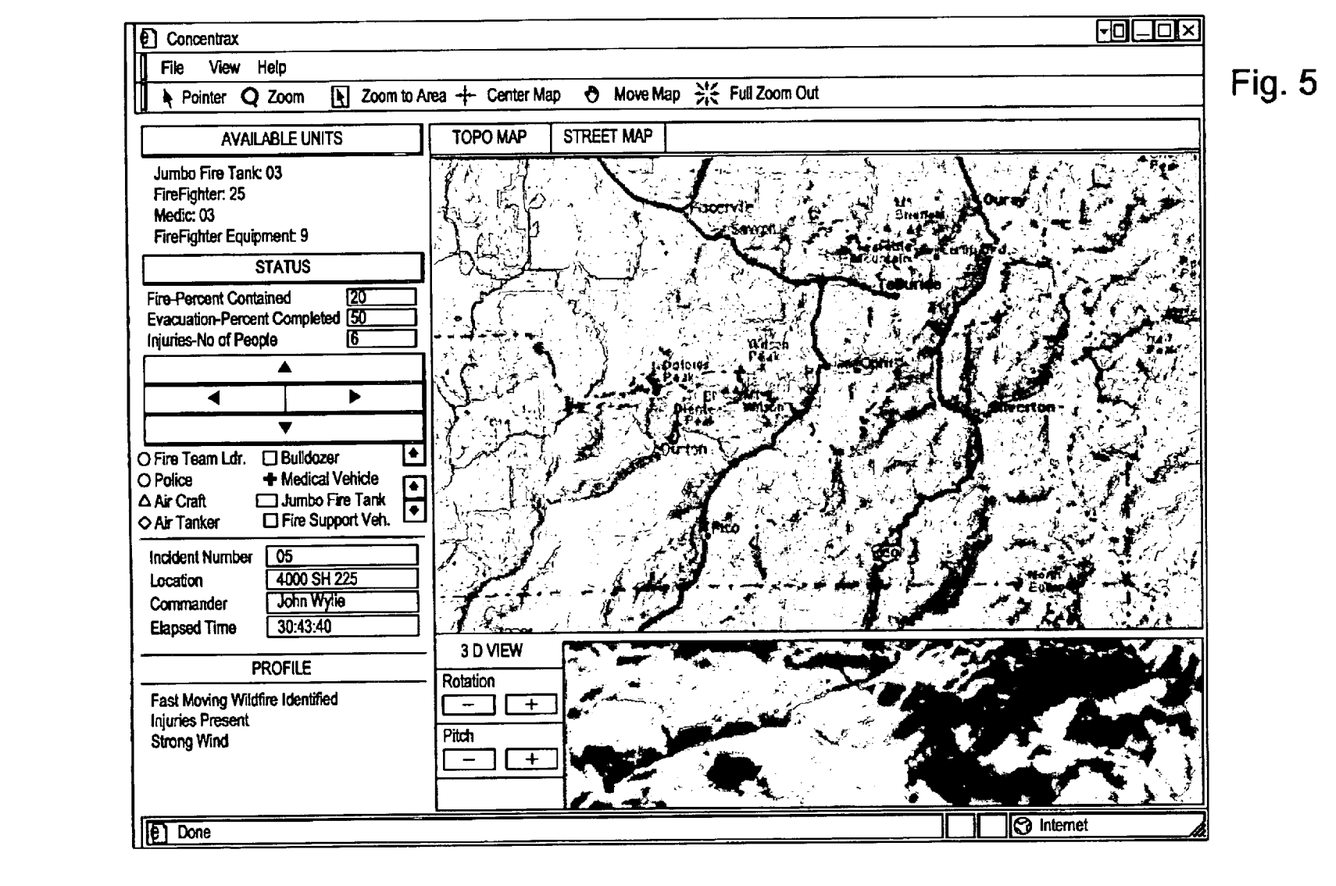
FIG. 5 is an image generated by the command center illustrating information about an incident with a topography map corresponding to a geographic region containing the incident in accordance with one embodiment of the present invention.

The maps of the present invention can include various amounts and types of information. The methods described herein can also include selecting a plurality of independently selectable maps of specific geographic regions stored within the map database 28. This can also include selecting a plurality of independently selectable maps of specific geographic regions selected from the group consisting of an aerial map (as shown in FIG. 3), a street map (as shown in FIG. 4), a topography map (as shown in FIG. 5), and combinations thereof. All of the map data should have the same ratio, i.e., one-to-one ratio, so that each map can overlie upon each other and all of the data can be synchronized to ensure accuracy of the information contained within the maps. For example, if a hazardous waste tank T-100 is located at X, Y on an aerial map, the hazardous waste tank T-100 also needs to be located at X, Y on a topography map so that the maps can be superimposed on each other and the location of tank T-100 will be accurate and the same. Use of a weather station as a component of a fixed GPS system would also increase the accuracy of the synchronization of the map data because the weather station location is known and stationary and could be used as a reference point for synchronization purposes.

The step of displaying at least a portion of the incident data, at least a portion of the equipment information, and at least a portion of the map data on a display 32 can include displaying at least a portion of the equipment data and at least a portion of the incident data on a map. The incident geographic region can be displayed on one or more maps. The preferred source for the street map database 28 is MapQuest, which is owned by MapQuest.com, Inc., having a business address of 3710 Hempland Road, Mountville, Pa. 17554-1542. The map can be selected from the group consisting of an aerial photograph map, a street map, a topography map, and combinations thereof. The system is capable of displaying and superimposing more than one map simultaneously. Further information that is relatively permanent in nature, such as the location of tanks in a tank farm and the chemicals contained in each, firehouses or the like can be input, stored and displayed as part of the map. As can be seen in FIGS. 3–5, information concerning the incidents and the equipment can also be included, along with the maps, on the display 32. This enables all of the needed information to be on one easy to read screen.

The step of displaying at least a portion of the incident data, at least a portion of the equipment information, and at least a portion of the map data on a map can also include utilizing a topography map, as shown in FIG. 5. This step can further include displaying at least a portion of the incident data, at least a portion of the equipment information, and at least a portion of the map data on a second topography map including a three-dimensional view with a variable pitch and a rotation for the second topography map. These features allow for a more thorough investigation of an area of concern within the topographic map.

The maps can be navigated so that a user can zoom in or concentrate on a zone of particular interest to the user. Standard map navigation techniques can be used such as panning, zooming, and the like. These map navigation techniques can be used on all of the different types of maps used in the present invention.

The maps can be annotated to assist the user in conveying pertinent information that could be needed and not available through any other resource, other than manually inputting the information. FIG. 5 shows an annotation indicating a path of movement of equipment, which was drawn in to assist responders in their response efforts.

Equipment 40 can include many different types of devices that are useful in dealing with an incident. Some examples include available manpower, fire team leaders, medical personnel, police personnel, emergency personnel, bulldozers, jumbo fire tanks, helicopter water drops, aerial tanker water drops, fire support vehicles, a hazmat team, staging area, incident command center 30, and combinations thereof. Equipment can be grouped into types, such as mobile equipment for vehicles and manpower. Auxiliary equipment can include particular equipment stored or available on the mobile equipment, such as the number of fire hoses on a fire vehicle or a police dog in a particular police vehicle. Control equipment would include items such as staging area and command center 30. Any type of equipment that would be helpful in dealing with an incident can be included in this system and will be known to the skilled in the art and are to be considered within the scope of all embodiments of the present invention. The equipment database 34 has a listing of equipment available for use during the incident. For example, one fire engine could contain four firefighters, two hoses, and one trained medic. This information would be stored within the equipment database 34 and would be displayed to allow the command center 30 to determine if additional resources are required.

The method of interactively tracking and inventorying incident response equipment can include updating an actual status of the equipment information within the incident response equipment. One way to enable updating this information if for the equipment transceiver 42 to include a data entry device 41 that allows personnel located within the vicinity of the equipment 40 to provide the command center 30 with an update of available equipment. For example, the previously described fire engine could have destroyed one of its hoses. Personnel within the vicinity of the fire engine could input the loss of the hose to keep the actual status of the available equipment current. Such updates can occur using the communication network 25, as described herein.

The method of interactively tracking and inventorying incident response equipment 40 can include updating the incident data, the equipment location, and the map data at a predetermined time interval. The predetermined time interval is preferably every 10 seconds.

The present invention also advantageously provides a system 15 for interactive tracking and inventorying of incident response equipment 40. The system 15 preferably includes an incident locator 21, a GPS 20, at least one transceiver 42, a communication network 25, a data center 26, a map database 28, an equipment database 34, a command center 30, and a data network 24.

The incident locator 21 is for determining an incident location, an incident identification, and an incident profile. The incident locator 21 can include a call center for notifying an agency of an incident to allow the agency to activate the incident locator 21. In alternate embodiments, the incident locator 21 can be activated automatically or manually. As previously discussed, the call center can be an existing city's normal emergency notification system. Houston, Texas' Transtar system is an example of such a notification system that could be used with the present invention.

Equipment transceiver 42 is mountable on one of a plurality of equipment 40, receives global positioning signals from the GPS system 20, and transmits an equipment location signal based upon the global positioning signals to the command center 30 through the communication network 25. The GPS 20 can be a differential GPS beacon system 50, as understood by those of skill in the art. The communication network 25 preferably includes a wireless communication portion for receiving the equipment location from the transceiver 42 and the incident location and for transmitting the equipment location and the incident location to the data center 26.

The data center 26 preferably stores the equipment location and the incident location in an incident database and correlates the equipment location with equipment information and the incident location with the incident profile to produce incident data. The incident database further includes incident contact information that can be accessed to allow users to determine what agencies should be contacted during the incident. The map data for at least one geographic region is stored in a map database 28 also contained within the data center 26.

The command center 30 preferably includes a data entry device 31, a processor 33, a memory device 35, and a display 32. The display 32 is used to display at least a portion of the incident data and at least a portion of the map data corresponding to the incident location and the equipment location that is received from the data center 26. The data entry device 31 is used to enter the incident location, the incident identification, and the incident profile into the tracking and inventorying system 15. The data entry device 31 can be integrated with the incident locator 21 to enable users to input information about the incident into the system 21.

The data network 24 couples the data center 26 and the command center 30 in data communication. The command center 30 accesses the data network 24 to obtain the incident data, the map data from the map database 28, and information from the archival database 27, which are then transmitted through the data network 24 from the data center 26 to the command center 30.

The system 15 can also include a data entry device 41 in the vicinity of the equipment for inputting an actual status of the equipment information from within the incident response equipment 40. The data entry device 41 will allow personnel located within or near the equipment 40 to inform the command center 30 if any of its equipment has been depleted or replenished.

The system 15 can also include a remote computer 36 in which access to the command center 30 can be gained. Remote access allows the system 15 to be more flexible. Remote access can be important if physical access to the command center 30 is not possible or would not be safe.

The system 15 can also include a plurality of independently selectable maps of specific geographic regions stored in the map database 28. The map data can be selected from the group consisting of an aerial map, a street map, a topography map, and combinations thereof. The system 15 can also include a superimposer to display more than one map simultaneously and also overlap the maps. A second topography map including a three-dimensional view with a variable pitch and a variable rotation can also be included, as shown in FIG. 5, as an additional feature of the present system 15.

The map data, the incident information, and the equipment information can be displayed in various ways. For instance, the display 32 can display the map data, the incident position, and the equipment position independent from each other. The display 32 can also include at least one map zoom and centralized map centering about a point of interest on the display 32.

The command center 30 can further include a means for following the path of movement of a selected equipment on the map display 32. The means for following the path of movement of a selected equipment can include an annotation means to annotate the display 32 as needed.

The system 15 can also include a data transmitter for transmitting the equipment location, the equipment identification, the equipment information, and the correlated data to a mobile unit. The mobile unit can be a remote computer 36. The data transmitter can be a data network that allows the mobile unit to access the command center 30.

Figure 6:
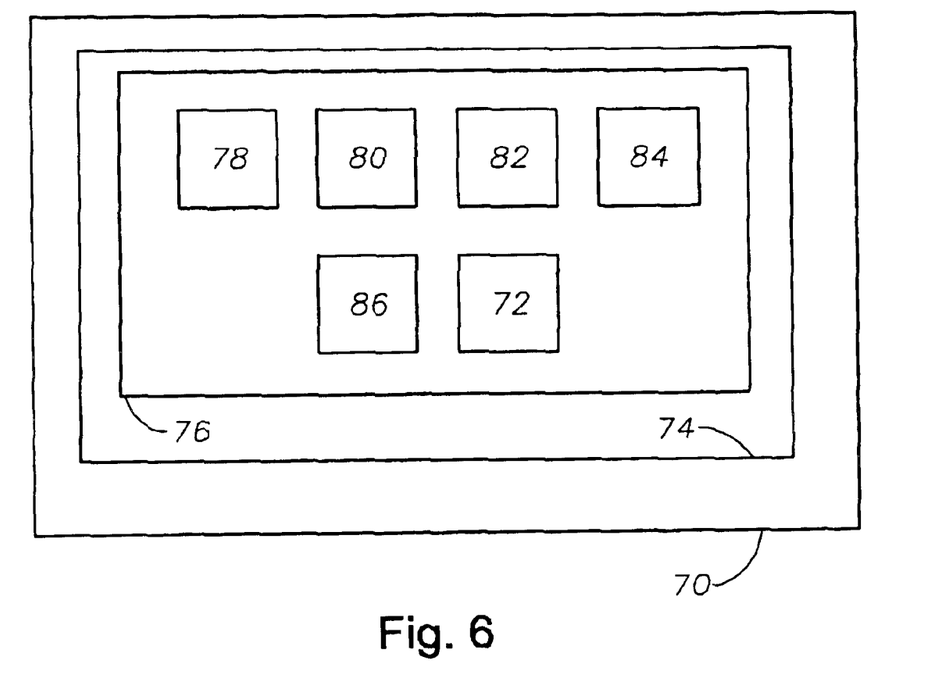
FIG. 6 is a simplified block diagram of a data processing system including an interactive tracking and inventorying manager in accordance with one embodiment of the present invention.

As illustrated in FIG. 6, the present invention also advantageously provides a data processing system 70 that is used to perform the methods described herein. The data processing system 70 preferably includes a computer readable media 74 and an interactive tracking and inventorying manager 76. The interactive tracking and inventorying manager 76 preferably includes an incident locator 78 to determine an incident location and an equipment locator 72 to determine an equipment location. A correlator 80 is then used to correlate the equipment location and an equipment identification with equipment information and the incident location with an incident profile to produce incident data. The incident data preferably includes an incident geographic region containing the equipment location and the incident location. A map data accessor 82 is used to access map data for at least the incident geographic region. A map data transmitter 84 for transmitting map data from a map database 28 to a command center 30 through a data network 24 is used. A display 86 for displaying at least a portion of the incident data is also provided. Preferably, at least a portion of the equipment information; and at least a portion of the map data corresponding to the incident geographic region are displayed on the display 86.

It is envisioned that access to the interactive tracking and inventorying manager 76 will be through active server pages (ASP). The interactive tracking and inventorying manager 76 can reside on a computer readable storage device, such as a compact disc, and be installed on a personal computer. The command center 30 can be accessed through the Internet connection on the personal computer.

In each embodiment of the present invention that uses the equipment transceiver 42, the equipment transceiver 42 can be any type of device that is capable of receiving a signal, such as the global positioning system signals, and also sending or transmitting a signal, such as sending a signal to the command center. For example, a transceiver or a transponder is suitable for use as the equipment transceiver. Other suitable devices will be known to those of ordinary skill in the art and are to be considered within the scope of the present invention.

The present invention has many advantages over prior art tracking systems. The system advantageously provides a system that will track the location of vehicles and equipment and also correlate this information to determine what resources are available upon these vehicles and equipment for use in an incident.

As another advantage, the interactive communication capabilities allow the inventory of incident response equipment to be current. This feature is particularly useful when the incident is relatively large or if it lasts for an extended period of time. If the incident lasts for several days, it is important to know which resources have been depleted and which resources have been replenished. This enables the incident responders better manage their resources and know when to seek additional assistance from additional agencies.

Another advantage of the present invention is the user-friendly format that the data is provided to users of the system. The ability to select different types of maps is advantageous because you could need the information in a different format. Because various types of information are available to the incident commander, the incident commander is able to better understand the terrain and structures involved in an emergency. For example, if you have a wildfire in a deserted forest area, a street map would be helpful to determine if there are any roads that would give fire fighters closer access to the fire. In this same situation, a topography map would also be helpful to enable air tanker planes to know if there were mountains or other obstacles that could hinder their water drop. The ability to see this information graphically enables fire fighters to make much better decisions when trying to decide the best course of action to deal with the fire.

As yet another advantage of the present invention is that it enables units from various agencies to be monitored and inventoried together, as opposed to each agency monitoring its own units. This feature allows the agencies to work together more productively to mitigate the incident faster and more efficiently.

Another advantage of the present invention is that existing emergency response system equipment can be used, thereby decreasing installation and training costs associated with the methods and systems described herein. For example, existing GPS systems with transceivers currently installed within equipment, such as police cars and fire trucks, can be adapted to be used with the system. New equipment transceivers are not necessary.

While the invention has been shown or described in only some of its forms, it should be apparent to those skilled in the art that it is not so limited, but is susceptible to various changes without departing from the scope of the invention.

For example, various other status information can be added to the monitoring system. For example, the time period in which each piece of equipment has been used could be added to the system. As another example, it is envisioned that the system could be used on any type of incident in which an overview of available resources was needed. As yet another example, the equipment database 34 could be used as an auditing checklist for all participating agencies to ensure all of their own equipment is in place.

What is claimed is:

1. A method of interactive tracking and inventorying of incident response equipment, the method comprising the steps of:

identifying an existence of an incident location;

determining an incident identification, and an incident profile;

entering the incident location, the incident identification, and the incident profile into a command center;

receiving global positioning signals from a GPS, the global positioning signals being received with an equipment transceiver that is located in close proximity to the incident response equipment, and transmitting an equipment location signal based upon the global positioning signals with the equipment transceiver through a communication network to the command center;

receiving the equipment location signal from the equipment transceiver through a communication network and ascertaining an equipment location at the command center;

coupling a data center and the command center in data communication with a data network;

obtaining equipment information from an equipment database stored on a memory of the data center and transmitting the equipment information from the data center to the command center through the data network;

correlating the equipment location and an equipment identification with the equipment information and the incident location with the incident profile to produce incident data, the incident data including an incident geographic region containing the equipment location and the incident location;

accessing map data for at least the incident geographic region stored in a map database located within the data center;

transmitting the map data through the data network to the command center; and displaying at least a portion of the incident data, at least a portion of the equipment information, and at least a portion of the map data corresponding to the incident geographic region at least at the command center.

2. A method as defined in claim 1, further comprising: selecting a plurality of independently selectable maps of specific geographic regions stored within the map database.

3. A method as defined in claim 2, wherein selecting a plurality of independently selectable maps of specific geographic regions includes selecting a plurality of independently selectable maps of specific geographic regions selected from the group consisting of an aerial map, a street map, a topography map, and combinations thereof, each of the independently selectable maps having a same ratio.

4. A method as defined in claim 3, wherein the step of displaying at least a portion of the incident data, at least a portion of the equipment information, and at least a portion of the map data on a display includes displaying at least a portion of the equipment data and at least a portion of the incident data on a map.

5. A method as defined in claim 4, wherein the step of displaying at least a portion of the incident data, at least a portion of the equipment information, and at least a portion of the map data on a map includes utilizing a map selected from the group consisting of an aerial photograph map, a street map, a topography map, and combinations thereof.

6. A method as defined in claim 5, further comprising synchronizing, displaying, and superimposing more than one map simultaneously.

7. A method as defined in claim 4, wherein the step of displaying at least a portion of the incident data, at least a portion of the equipment information, and at least a portion of the map data on a map includes utilizing a topography map, and further comprising:

displaying at least a portion of the incident data, at least a portion of the equipment information, and at least a portion of the map data on a second topography map including a three-dimensional view with a variable pitch and a rotation for the second topography map.

8. A method as defined in claim 1, further including accessing the command center from a remote computer in data communication with the command center.

9. A method as defined in claim 1, further including updating the incident data, the equipment location, and the map data at a predetermined time interval.

10. A method as defined in claim 9, wherein the predetermined time interval is ten seconds.

11. A method as defined in claim 1, further including updating the equipment information by inputting an actual status of the equipment information within the incident response equipment and transmitting the actual status of the equipment information through the equipment transceiver to the command center.

12. A method as defined in claim 3, wherein correlating the equipment location and an equipment identification with equipment information from an equipment database to obtain equipment data includes utilizing equipment information selected from the group consisting of an associated agency, an equipment type, and available resources.

13. A method as defined in claim 3, wherein correlating the equipment location and an equipment identification with equipment information from an equipment database to obtain equipment data includes utilizing equipment information selected from the group consisting of manpower, fire team leaders, fire team personnel, medical personnel, police personnel, emergency personnel, bulldozers, jumbo fire tanks, helicopter water drops, aerial tanker water drops, fire support vehicles, weapons, hazmat, and combinations thereof.

14. A method as defined in claim 1, further including the step of archiving all information related to the incident so that all information related the incident can be reviewed and critiqued at a later time period.

15. A system for interactive tracking and inventorying of incident response equipment, the system comprising:

at least one equipment transceiver mountable on incident response equipment, each equipment transceiver operable to receive global positioning signals sent from a GPS and operable to transmit an equipment location signal based upon the global positioning signals to a command center;

an incident locator for determining an incident location, an incident identification, and an incident profile;

a data entry device for entering the incident location, the incident identification, and the incident profile into the command center;

a communication network for transmitting the equipment location signal from the equipment transceiver to the command center;

a data center coupled to the command center in data communication with a data network, the data center including an equipment database containing equipment information and a map database containing map data and the data network coupling the data center and the command center in data communication, the command center accessing the data network to obtain the equipment information and the map data through the data network;

a correlator within the command center for correlating the equipment location and an equipment identification with the equipment information and the incident location with the incident profile to produce incident data, the incident data further includes incident contact information and an incident geographic region containing the equipment location and the incident location; and the command center further including a processor, a memory device, and a display for displaying at least a portion of the incident data, at least a portion of the equipment information, and at least a portion of the map data corresponding to the incident geographic region, the processor for ascertaining an equipment location based upon the equipment location signal received from the equipment transceiver.

16. A system as defined in claim 15, further including a remote computer for accessing the command center.

17. A system as defined in claim 15, wherein the data network is the Internet.

18. A system as defined in claim 15, further including an equipment data entry device for inputting an actual status of the equipment information from within the incident response equipment.

19. A system as defined in claim 15, further comprising: a plurality of independently selectable maps of specific geographic regions stored in the map database.

20. A system as defined in claim 15, wherein the map data is selected from the group consisting of an aerial map, a street map, a topography map, and combinations thereof.

21. A system as defined in claim 20, further comprising a superimposer to display more than one map simultaneously and overlap the more than one map.

22. A system as defined in claim 15, wherein the display displays at least a portion of the incident data, at least a portion of the equipment information, and at least a portion of the map data corresponding to the incident location and the equipment location upon a second topography map comprising a three-dimensional view with a variable pitch and a variable rotation.

23. A system as defined in claim 15, wherein the display displays the map data, the incident position, and the equipment position independent from each other.

24. A system as defined in claim 23, wherein the display provides at least one map zoom and centralized map centering about a point of interest on the display.

25. A system of claim 24, wherein the command center further comprises: a means for following the path of movement of a selected equipment on the map display.

26. A system as defined in claim 15, wherein the equipment information comprises an associated agency, an equipment type, and available resources.

27. A system as defined in claim 15, wherein the incident equipment is selected from the group consisting of manpower, fire team leaders, fire team personnel, medical personnel, police personnel, emergency personnel, bulldozers, jumbo fire tanks, helicopter water drops, aerial tanker water drops, fire support vehicles, weapons, hazmat team, staging area, incident command center, and combinations thereof.

28. A system as defined in claim 15, wherein the GPS comprises a differential GPS.

29. A system as defined in claim 28, wherein the differential GPS includes at least one stationary weather station.

30. A system as defined in claim 15, further comprising a data transmitter for transmitting the equipment location, the equipment identification, the equipment information, and the correlated data to a mobile unit.

31. A system as defined in claim 15, wherein the incident locator comprises a call center for notifying an agency of an incident to allow the agency to activate the incident locator.

32. A system as defined in claim 31, wherein the incident locator is activated manually.

33. A system as defined in claim 32, wherein the incident locator is activated automatically.

34. A system as defined in claim 15, wherein the data center further comprises an archival database to store all information related to the incident so that all information related the incident can be reviewed and critiqued at a later time period.

35. A data processing system comprising:
a computer readable media; and
an interactive tracking and inventorying manager comprising:
an incident locator to determine an incident location;
an equipment locator to determine an equipment location;
a correlator for correlating the equipment location and an equipment identification with equipment information and the incident location with an incident profile to produce incident data, the incident data including an incident geographic region containing the equipment location and the incident location;
a map data accessor for accessing map data for at least the incident geographic region;
a map data transmitter for transmitting map data from a map database to a command center through a data network; and
a display means for displaying at least a portion of the incident data, at least a portion of the equipment information; and at least a portion of the map data corresponding to the incident geographic region.

36. A computer readable storage device comprising an interactive tracking and inventorying manager further comprising:
an incident locator to determine an incident location;
an equipment locator to determine an equipment location;
a correlator for correlating the equipment location and an equipment identification with equipment information and the incident location with an incident profile to produce incident data, the incident data including an incident geographic region containing the equipment location and the incident location;

a map data accessor for accessing map data for at least the incident geographic region;

a map data transmitter for transmitting map data from a map database to a a display means for displaying at least a portion of the incident data, at least a portion of the equipment information, and at least a portion of the map data corresponding to the incident geographic region.

* * * * *